(12) United States Patent  
Hunter

(10) Patent No.: US 6,233,147 B1  
(45) Date of Patent: May 15, 2001

(54) APPARATUS FOR SECURING A COMPONENT IN A COMPUTER CHASSIS

(75) Inventor: Bryan K. Hunter, Austin, TX (US)

(73) Assignee: Micron Electronics, Boise, ID (US)

( * ) Notice: Subject to any disclaimer, the term of this patent is extended or adjusted under 35 U.S.C. 154(b) by 0 days.

(21) Appl. No.: 09/324,708

(22) Filed: Jun. 3, 1999

(51) Int. Cl.$^7$ .................................................. H05H 7/20
(52) U.S. Cl. ........................ 361/690; 361/725; 361/809
(58) Field of Search ....................... 312/223.2; 361/600, 361/679, 685–687, 690, 724–727, 694–695, 807, 809, 810

(56) References Cited

U.S. PATENT DOCUMENTS

| | | | |
|---|---|---|---|
| 4,296,454 | 10/1981 | Wong | 361/280 |
| 4,937,806 | * 6/1990 | Babson et al. | 361/727 |
| 5,207,327 | 5/1993 | Brondos | 206/523 |
| 5,473,507 | 12/1995 | Schwegler et al. | 361/690 |
| 5,510,954 | 4/1996 | Wyler | 361/685 |
| 5,596,483 | 1/1997 | Wyler | 361/683 |
| 5,644,472 | 7/1997 | Klein | 361/695 |
| 5,767,445 | * 6/1998 | Wu | 361/727 |
| 5,877,938 | * 3/1999 | Hobbs et al. | 361/724 |
| 5,995,365 | * 11/1999 | Broder et al. | 361/727 |
| 6,064,568 | * 5/2000 | Schmitt | 361/727 |

* cited by examiner

*Primary Examiner*—Gregory Thompson
(74) *Attorney, Agent, or Firm*—Paul A. Revis

(57) ABSTRACT

An apparatus for securing a component in a computer chassis. The apparatus provides a tray that may be made from a resilient material in which the computer component is encased. The computer component is thereby isolated from physical shock applied to the chassis, and sound from the component is dampened from escaping the confines of the apparatus. Embodiments of the tray are particularly constructed to be placed near the top of a tower configuration computer and encased by a cover that keeps the component secured. The cover is removable and therefore allows for ready access to the component.

25 Claims, 3 Drawing Sheets

APPARATUS FOR SECURING A COMPONENT IN A COMPUTER CHASSIS

TECHNICAL FIELD

The present invention is directed toward an apparatus and method for securing a component in a computer chassis. More particularly the invention is directed to securing a component in a tray near the top of a tower configuration computer by use of a cover over the top of the computer.

BACKGROUND OF THE INVENTION

Personal computers typically employ a metal chassis to support a number of components such as a power supply, a motherboard, several expansion boards, a hard disk drive, a floppy disk drive, and others. An ideal computer would run silently, generate little or no heat, and be highly resistant to physical shock. However, a conventional personal computer system generates noise and heat and can be severely damaged by sharply applied physical force. Two parts of a computer that generate vibration, noise, and heat arc the hard disk drive and the power supply. A hard disk drive has moving parts that necessarily generate vibration, noise, and heat. A power supply has an electrical transformer that generates heat, and therefore a power supply often is combined with a cooling fan. The cooling fan of the power supply creates vibration and noise.

A primary reason that a hard disk drive creates noise is that the movements of the parts of the hard drive cause vibrations which resonate in the computer chassis. The typical computer component is rigidly fixed to the computer chassis. A rigid connection efficiently transfers vibrations from a component such as a hard drive to the chassis. Therefore, in a conventional computer system a hard drive vibrates the chassis. The vibrating and resonating computer chassis thereby amplifies the noise generated by the hard drive. A typical computer fails to isolate the hard drive from rigid connection to the computer chassis and therefore falls to abate noise and vibration cause by the hard drive.

Similar to the vibration and noise transfer among components and the chassis described above, physical shock transferred among components and the chassis is problematic. Rigid connections do not allow for adequate shock isolation for components. That is, with a rigid connection, practically all of the force of a blow that is applied to a chassis is nearly instantaneously transfer red to a component connected to the chassis. What is needed is a resilient connection that allows for a delayed or dampened force transfer between the chassis and a component.

Another failing of a typical personal computer system is that the components within a chassis are not easily installed during manufacturing or easily accessible for maintenance purposes. A disadvantage of many personal computer chassises is that in order to access the components of the system, the computer chassis must be turned on its side, multiple fasteners must be removed, and the external connections to the computer may even need to be disconnected.

What is needed is a means for holding a computer component in a computer chassis that isolates vibrations of the component from the chassis and vice versa. As a result, noise transfer and physical shock transfer between the component and the chassis would be reduced. An improved system should also provide easy access to the component and be structured for adequate cooling of the component. In a system providing improved access, manufacturing and maintenance convenience would be increased and manufacturing and maintenance times would be reduced. The prior art has failed to provide a system that not only allows ready access to a component, but also dampens the noise from the component and the transfer of physical shock to the component, and provides for cooling of the component.

SUMMARY OF THE INVENTION

One embodiment of the invention is an apparatus for securing a computer component with a chassis and a tray that is coupled to at least three sides of the chassis. The tray is for holding the computer component. A cover is coupled to the chassis and is removable from the chassis. The cover secures the computer component in the tray, and because it is removable, provides ready access to the computer component.

Another embodiment of the invention is an apparatus for securing a computer component with a chassis of a tower configuration computer system. The chassis has a receiving bay in the top portion of the chassis. The embodiment also has a tray coupled to the chassis. The tray fits within the receiving bay and is for holding the computer component by contacting the computer component on at least a portion of all six major surfaces of the computer component. The tray is formed from a resilient material. The embodiment also has a cover coupled to the chassis for securing the computer component in the tray by preventing movement of the computer component away from the chassis. Movement of the component is prevented by preventing movement of a top portion of the tray away from the chassis.

Still Another embodiment of the invention is a method of assembling a computer comprising the following acts. A first act is to insert a computer component in a tray formed from a resilient material, the tray being coupled to four contiguous sides of a chassis. The second act of the embodiment is to connect the computer component to an electrical connection. A third act is to couple a removable cover to the chassis to secure the computer component in the tray.

DETAILED DESCRIPTION OF THE INVENTION

Apparatus for Securing a Computer Component

Figure 1:
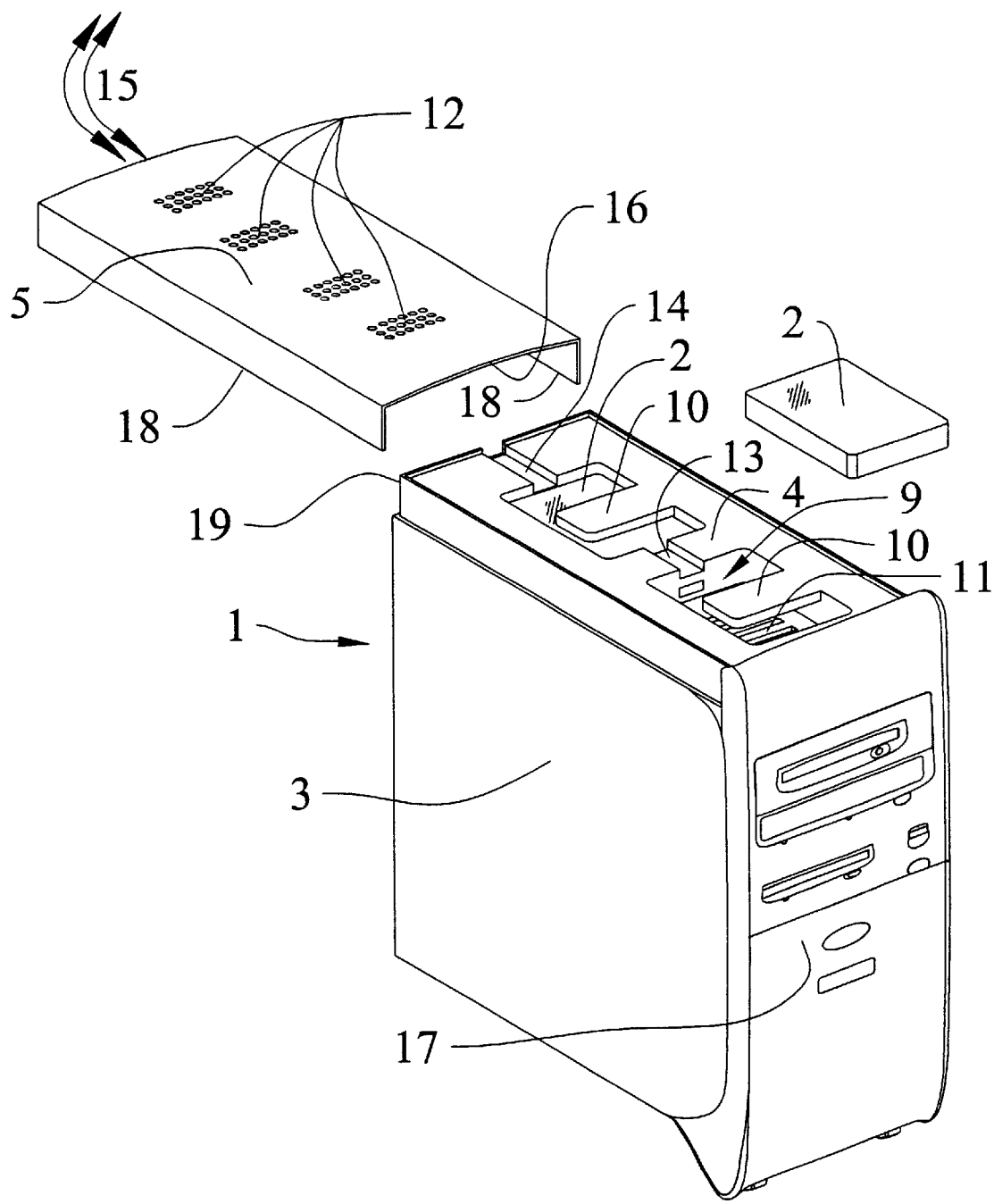
FIG. 1 is top perspective view of the apparatus that is partially exploded to better show the relationship of certain parts.

As depicted in FIG. 1, embodiments of the present invention are directed toward an apparatus 1 for securing a computer component 2 in a chassis 3 of a computer system. A tray 4 formed from a resilient material may be used to hold the computer component 3. In select embodiments, the tray 4 is coupled to four contiguous sides of the chassis 3. A removable cover 5 may also be coupled to the chassis 3 to secure the computer component 2 in the tray 4. Use of a removable cover 5 provides for ready access to the computer component 2.

Chassis

As illustrated in FIG. 1, an embodiment of the invention is adapted to be employed with the chassis 3 of a tower computer configuration. A tower configuration is characterized by height and depth substantially larger than width. The term tower configuration includes a so called full tower chassis, a mini-tower chassis, and a micro-tower chassis. The distinction among these designations is generally the height of the chassis, and therefore the capacity of the chassis to hold larger numbers of components. Other sizes of tower chassis as well as other varieties of chassis may be used with the invention also. For instance, certain desktop computer chassises are convertible to tower configurations by merely rotating the components and/or bays within a chassis by 90 degrees. Therefore, while aspects of the invention such as case of removal of the cover 5 may be enhanced with a tower configuration chassis, the invention may nonetheless be an improvement to other 5 chassis configurations.

Figure 2:
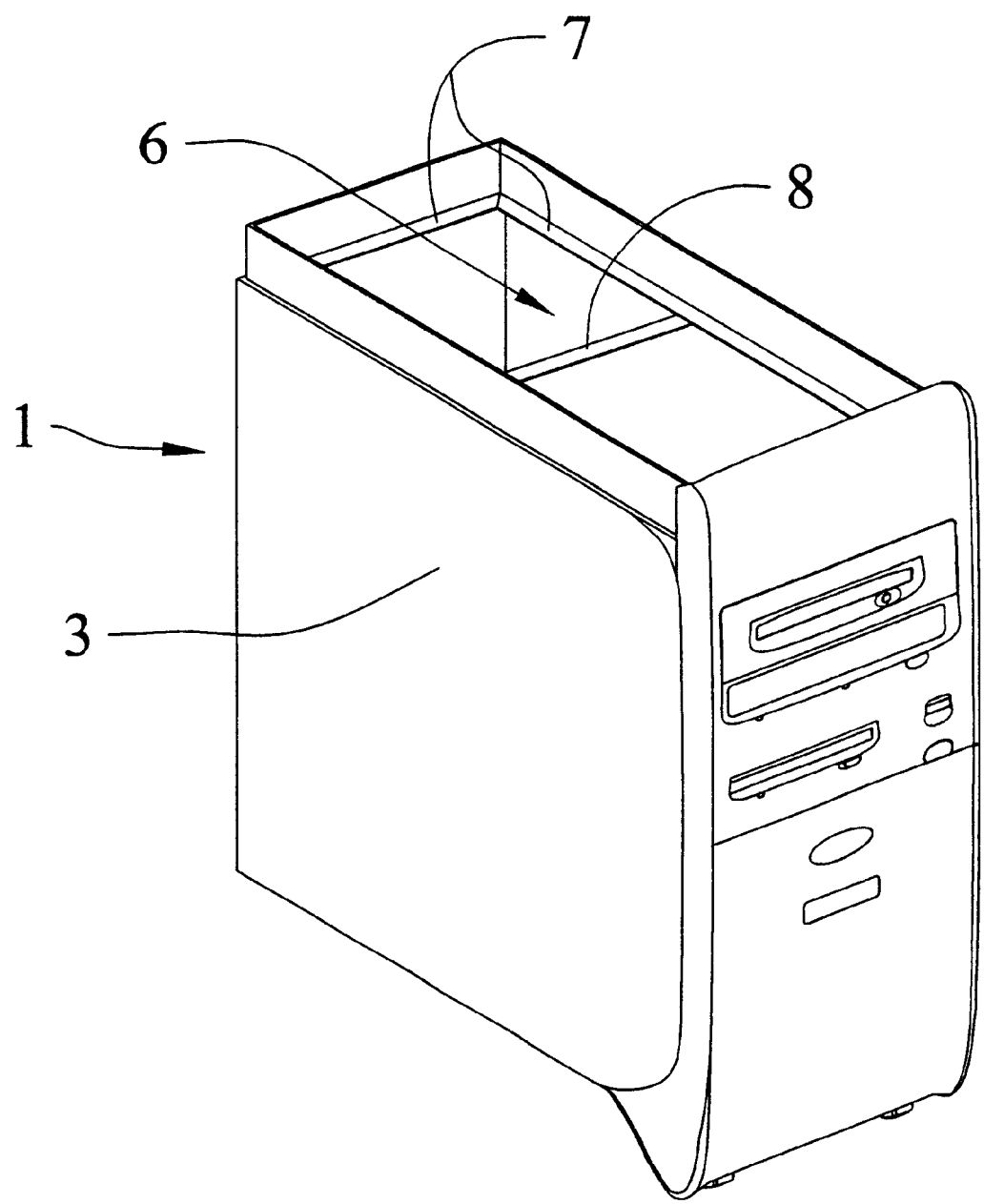
FIG. 2 is a top perspective view of the apparatus of FIG. 1 with the tray and cover removed.

As shown in FIG. 2, embodiments of the invention include a receiving bay 6 in the top portion of the chassis 3. The receiving bay 6 shown includes a lip 7 on which edges of the tray 4 (FIG. 1) may be supported. Additionally, the chassis 3 may provide one or more strap supports 8 to support the center of the tray 4 (FIG. 1).

Tray

The tray 4, as shown in FIG. 1, is coupled to four contiguous sides of the chassis. Specifically, the tray 4 fits within the receiving bay 6 (FIG. 2), the confines of which are described above. The tray 4 is for holding one or more computer components 2. A computer component could be a hard disk drive, a power supply, a removable disk drive such as a floppy disk drive or optical disk drive, or any other component that is now or may later be found in a computer system. The tray 4 might also be coupled to only three of the sides of the chassis 3 in some embodiments.

In the embodiment shown in FIG. 1, a computer component 2 is held within an opening 9 in the tray 4. An appendage 10, that is part of the tray 4, extends from one side of the opening 9 to contact a side of the computer component 2 when the computer component is held in the opening. As held in the tray 4, including the use of the appendage 10 over the top side of the computer component 2, the computer component is isolated from contract with any other part of the apparatus 1 other than the tray 4. When held in the tray 4 as shown, portions of the tray contact all six major surfaces of the computer component 2. What is meant by the six major surfaces is the front and back sides of three dimensions of the computer component 2. If, for example, the computer component 2 were a cube, this would be the six surfaces of the cube. If the computer component 2 where a sphere, the six major surfaces would be at least parts of the surfaces on all major dimensional sides of the component.

Figure 3:
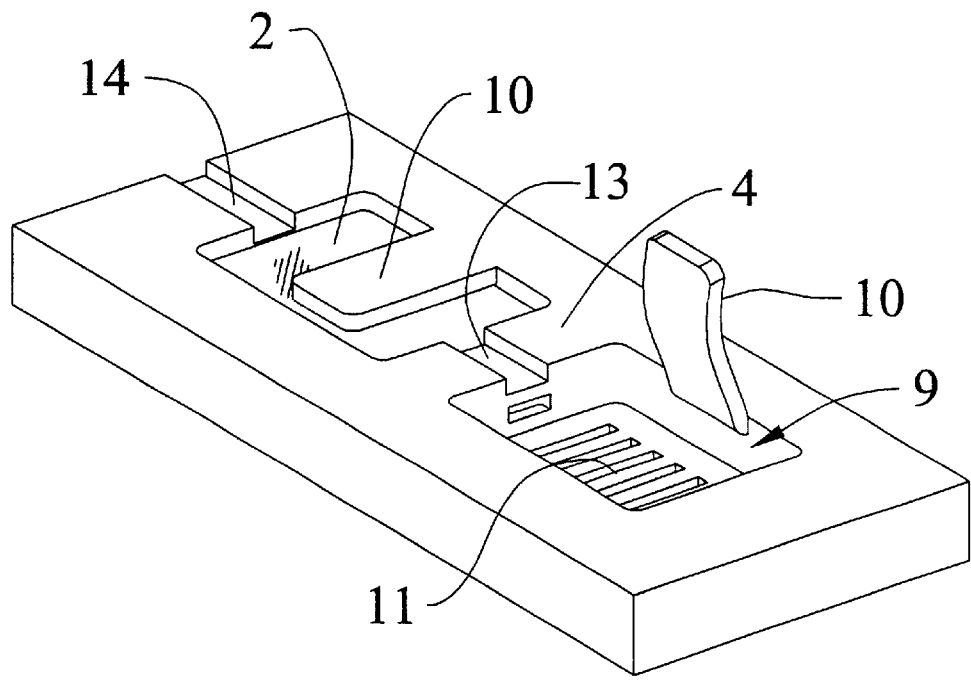
FIG. 3 is a top perspective view of the tray of FIG. 1.

The appendage 10 of the invention is more precisely illustrated in FIG. 3. As shown, the appendage 10 is partially removable from the opening 9. The appendage 10 is only partially removable in that it is permanently affixed to and is in fact a part of the tray 4. The incorporation of the appendage 10 into the tray 4 is an advantage of the invention in that a loose part requiring additional handling and that is subject to being lost is not created. FIG. 3 shows one of the appendages 10 in a typical at rest position making contact with the top of a computer component 2. The other appendage 10 is shown partially removed from the opening 9. With the appendage 10 partially removed from the opening 9, enough of a space is created so that a computer component 2 may be place in or removed from the opening.

As illustrated in FIGS. 1 and 3, the tray 4 is formed from a material that is resilient and capable of abating both sound and physical shock. A resilient material is a material that returns to its original form after deformation. Such materials may occur naturally, or may be fabricated synthetically. Any material exhibiting resilience and an ability to abate both sound and physical shock would be acceptable in such an embodiment. Two materials that have such properties are foam rubber and urethane foam. In other embodiments, the tray may be formed from materials that are not resilient as described above. In such embodiments, the improved access characteristics of the invention may nonetheless be utilized.

In some embodiments of the invention, the tray may be impregnated with or coated by electrically conductive materials that provide electromagnetic interference (EMI) isolation of the computer components 2 from other components inside the chassis 3.

By surrounding the computer component 2 with the tray 4 that has both sound abating and physical shock resistant characteristics, noise from the computer component 2 is lessened outside of the apparatus 1. Additionally, physical shock to the component 2 is reduced during such activities as manufacturing, transportation, maintenance, or even routine use in certain applications.

In addition to sound and physical shock concerns, the tray 4 meets the cooling needs of a computer component 2. As shown in FIGS. 1 and 3, air ducts through the tray 4 are provided to supply cooling air to and to exhaust cooling air from the computer components 2. FIG. 3 illustrates two air flow alternatives that may be use separately or in conjunction with one another. Air flow may be in either direction in either path, depending on the bias of associated fans that may be used to force the air. A first air flow path includes integrated air ducts 11 between the tray 4 and the interior of the chassis 3 below. Such a path is provided below both computer components 2. The first air flow path also includes access to air outside of the computer system through vent holes 12 in the cover 5.

A second air flow path also includes integrated air ducts 11. Additionally, the second path includes air channels 13 and 14 in tray 4. Access to air outside of the computer system for the second air flow path includes a hole (not shown) in the back of the cover 5. Air flow though the hole is illustrated by the directions of flow designated by the arrows 15 in FIG. 1.

Cover

As shown in FIG. 1, a removable cover 5 may be coupled to the chassis 3 to secure the computer components 2 in the tray 4. The cover 5 shown is in a removed position so that other aspects of the invention may be more clearly illustrated. The removable cover 5 provides ready access to the computer components 2 in that by simply removing the cover, the components are immediately accessible. When the cover 5 is secured to the chassis 3, the computer components 2 are secured in the tray 4. The cover 5 prevents movement of a top portion, such as the appendages 10, of the tray 4 away from the chassis 3. Consequently, movement of the computer components 2, which are in contact with the appendages 10, away from the chassis 3 is prevented.

The cover 5 may be secured to the chassis 3 to prevent movement of the cover away from the chassis by slidably engaging a front edge 16 of the cover under a portion of the chassis. For example, the front edge 16 may slidably engage under a top portion of the bezel 17 as shown in FIG. 1. In embodiments of the invention, lower edges 18 of the cover 5 may slidably engage and interlock with the chassis 3 to prevent movement of the cover away from the chassis.

Figure 4:
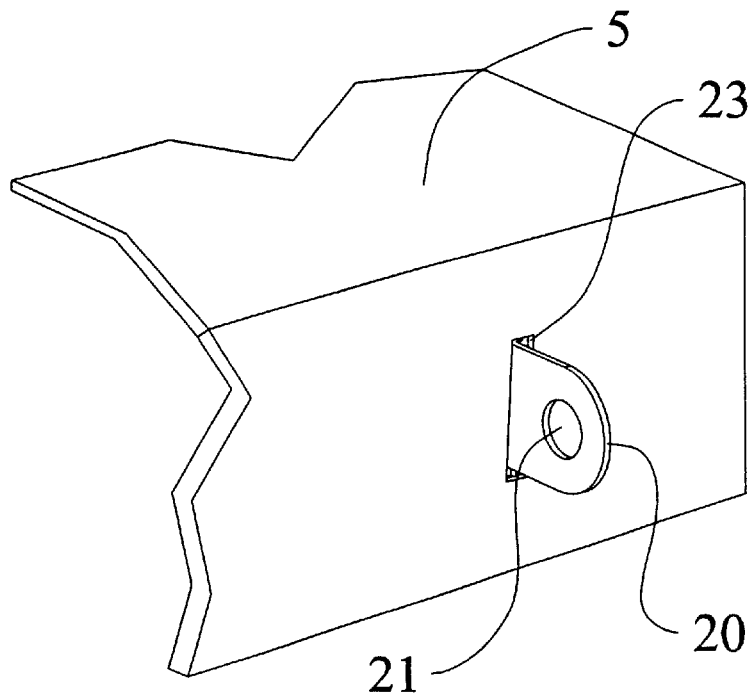
FIG. 4 is a top perspective view of a locking means as is employed with some embodiments of the invention.

The apparatus 1 may also include a locking mechanism to prevent unauthorized removal of the cover 5 from the chassis 3. As designated in FIG. 1, the lock may be located on the back side of the chassis 3 at the position numbered 19. FIG. 4 illustrates a lock of some embodiments of the invention. The tab 20 is attached to the chassis 3 and provides a hole 21 through which a lock or cable may be passed to prevent the cover 5 from moving relative to the chassis. The back of the cover 5 includes a slot 23 for accepting the tab 20. Other possible lock mechanisms include push button release mechanisms, a bolt type mechanism for attaching to the chassis 3 through the cover 5, twist mechanisms attached to the chassis and extending through the cover, and other mechanisms that effectively prevent movement of the cover relative to the chassis. An equivalent lock could be placed on a side of the chassis 3 rather than of the back as illustrated.

Method of Assembling a Computer

One embodiment of the invention is a method of assembling a computer. A first act of the method is to insert a computer component in a tray formed from a resilient material. The tray of the embodiment may be coupled to four contiguous sides of a computer chassis. In another act of the method, the computer component is connected to an electrical connection. The electrical connection may be a power connection, a data connection, or another similar connection common in a computer. Another act of the method is to couple a removable cover to the chassis to secure the computer component in the tray. The act of coupling a removable cover to the chassis may include the act of coupling the removable cover to a chassis of a tower computer configuration chassis. In some embodiments, the method may additionally include the act locking the removable cover to the chassis to prevent unauthorized removal of the cover and consequently the computer component.

From the foregoing it will be appreciated that, although specific embodiments of the invention have been described herein for purposes of illustration, various modification may be made without deviating from the spirit and scope of the invention. Accordingly, the invention is not limited except as by the claims.

Advantages of the Invention

An advantage of some embodiments of the present invention is that sound generated by a computer component is dampened. Additionally, embodiments of the invention isolate the computer component from physical shock.

Another advantage of some embodiments of the invention, in addition to the physical shock and sound advantages, is that at the same time the invention makes a component more accessible. The accessibility advantages exceed not only the accessibility of other systems with similar shock and sound advantages, but also the accessibility of other computer systems generally. The accessibility advantages provide for reduced time requirements for manufacturing or maintaining a computer system designed in accordance with the invention.

Yet another advantage of some embodiments of the invention is that while encasing a computer component in the novel manner described above, cooling is provided to the computer component.

What is claimed is:

1. An apparatus for securing a computer component comprising:
   a chassis having a receiving bay in a top portion of said chassis;
   a tray formed from a resilient material and coupled to three sides of said chassis within the receiving bay, said tray for holding the computer component; and
   a cover removably coupled to said chassis for securing the computer component in said tray by preventing movement of the computer component away from said chassis by preventing movement of a top portion of said tray away from said chassis.

2. The apparatus of claim 1 wherein said chassis is a tower computer configuration chassis having a height and depth substantially larger than its width.

3. The apparatus of claim 1 wherein said tray includes an opening for holding the computer component.

4. The apparatus of claim 3 wherein said tray includes an appendage for contacting one side of the computer component when the component is held in the opening.

5. The apparatus of claim 4 wherein the appendage extends from one side of the opening of said tray.

6. The apparatus of claim 4 wherein the appendage is partially removable from the opening such that the computer component may be placed in or removed from the opening when the appendage is partially removed from the opening.

7. The apparatus of claim 1 wherein a portion of said tray extends over a top side of the computer component to isolate the computer component from contact with any part of the apparatus other than said tray.

8. The apparatus of claim 1 wherein said tray includes air ducts through said tray for providing cooling air to and exhausting cooling air from the computer component.

9. The apparatus of claim 1 wherein said tray is formed from foam rubber.

10. The apparatus of claim 1 wherein said tray is formed from urethane foam.

11. The apparatus of claim 1 wherein said cover is the top cover of a tower computer configuration chassis.

12. The apparatus of claim 1 wherein said cover slidably engages under a portion of said chassis to prevent movement of said cover away from said chassis when said cover is so engaged.

13. The apparatus of claim 1 wherein said cover includes a vent hole through which cooling air is passed.

14. The apparatus of claim 1 wherein said cover and said chassis include a means for locking said cover to said chassis.

15. An apparatus for securing a computer component comprising:
   a chassis of a tower configuration computer system having a receiving bay in the top portion of said chassis;
   a tray coupled to said chassis by fitting within the receiving bay, said tray for holding the computer component by contacting the computer component on at least a portion of all six major surfaces of the computer component, said tray formed from a resilient material; and
   a cover coupled to said chassis for securing the computer component in said tray by preventing movement of the computer component away from said chassis by preventing movement of a top portion of said tray away from said chassis.

16. The apparatus of claim 15 wherein said tray includes air ducts through said tray for providing cooling air to and exhausting cooling air from the computer component.

17. The apparatus of claim 15 wherein said tray is formed from foam rubber.

18. The apparatus of claim 15 wherein said tray is formed from urethane foam.

19. The apparatus of claim 15 wherein said cover slidably engages under a portion of said chassis to prevent movement of said cover away from said chassis when said cover is so engaged.

20. The apparatus of claim 15 wherein said cover includes a vent hole through which cooling air is passed.

21. The apparatus of claim 15 wherein said cover and said chassis include a means for locking said cover to said chassis.

22. An apparatus for securing a computer component comprising:
- a means for isolating the computer component from the sound and physical shock environment outside of said isolating means wherein said isolating means is formed from a resilient material; and
- a means for encasing said isolation means comprising:
  - a means for supporting said isolating means, and
  - a means for enclosing said isolating means by covering a portion of said isolating means.

23. A method of assembling a computer comprising the acts of:
- inserting a computer component in a tray formed from a resilient material, the tray being coupled to four contiguous sides of a chassis, wherein the tray occupies substantially all of an uppermost portion of the chassis;
- connecting the computer component to an electrical connection; and
- coupling a removable cover to the chassis to secure the computer component in the tray.

24. The method of claim 22 wherein the act of coupling a removable cover to the chassis includes the act of coupling the removable cover to a chassis of a tower computer configuration chassis.

25. The method of claim 22 further comprising locking the removable cover to the chassis to prevent unauthorized removal of the cover and consequently the computer component.

* * * * *

UNITED STATES PATENT AND TRADEMARK OFFICE
CERTIFICATE OF CORRECTION

PATENT NO.    : 6,233,147 B1
DATED         : May 15, 2001
INVENTOR(S)   : Bryon K. Hunter It is certified that error appears in the above-identified patent and that said Letters Patent is hereby corrected as shown below:

ABSTRACT,
Item [75] Inventor: replace "Bryan" with -- Bryon --.

Signed and Sealed this

Eleventh Day of December, 2001

Attest:

*Nicholas P. Godici*

NICHOLAS P. GODICI
*Attesting Officer*   *Acting Director of the United States Patent and Trademark Office*